Dec. 9, 1924.
V. W. PAGÉ
1,519,043
REAR AXLE CONSTRUCTION
Filed April 27, 1921
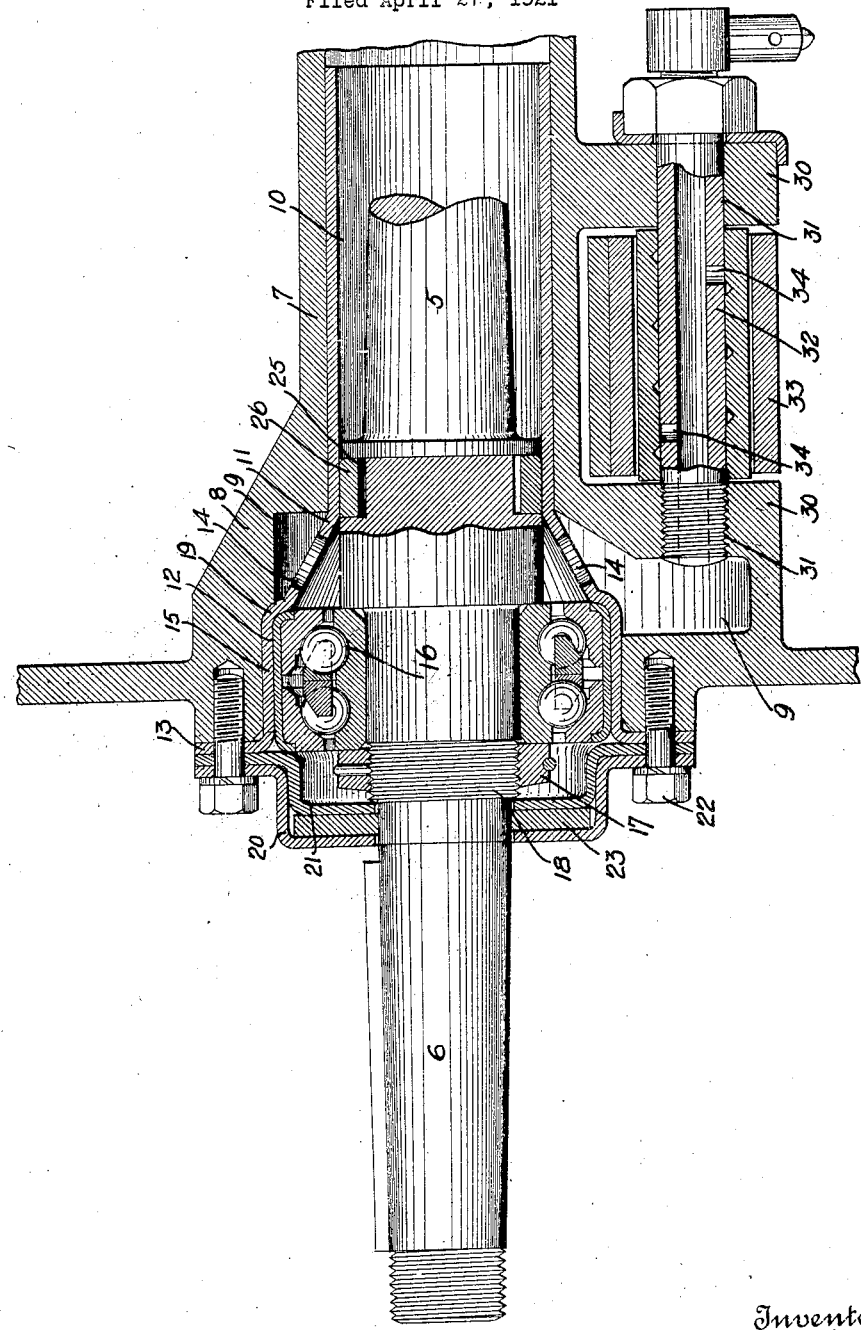
WITNESSES
Thomas Reichert
P. H. Pattison
Inventor
Victor W. Pagé
By Attorney Munn & Co Patented Dec. 9, 1924.

1,519,043

UNITED STATES PATENT OFFICE.

VICTOR W. PAGÉ, OF NEW YORK, N. Y.

REAR-AXLE CONSTRUCTION.

Application filed April 27, 1921. Serial No. 465,052.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Rear-Axle Construction, of which the following is a full, clear, and exact description.

The present invention relates to new and useful improvements in motor vehicles and it pertains more particularly to the rear axle housing construction therefor.

It is one of the objects of the invention to so construct a rear axle housing that light aluminum, magnesium alloys, such, for example, as magmalite, lynnite, and the like, may be employed.

It is a further object of the invention to provide a new and novel spring-attaching means for securing the rear end of springs to the axle housing.

It is a further object of the invention to provide a new and novel arrangement whereby the working parts of the rear axle may be thoroughly lubricated.

It is a still further object of the invention to so construct the spring suspension that the same will at all times be lubricated.

With the above and other objects in view, reference is had to the accompanying drawings in which the figure is a longitudinal sectional view of one end of a rear axle showing the new and improved form of housing constructed in accordance with the present invention.

Referring to the drawings by reference characters, 5 designates the axle and said axle projects beyond the axle housing as indicated at 6 to provide for the attachment of the wheels of the vehicle. The reference character 7 designates the rear axle housing, and said housing is formed of magmalite, lynnite, and similar light aluminum alloys. This axle housing 7 is formed on each of its ends with an enlarged portion 8, which enlarged portion is hollowed out to provide a chamber or the like for retaining a suitable lubricant in the form of grease. The axle housing 7 is provided with a lining 10 of relatively hard material, such as steel, and said lining extends throughout the length of the axle housing and has that end positioned within the chamber 9 flared as indicated by the reference character 11. The lining 10 of the axle housing 7 is extended as indicated by the reference character 12, beyond the chamber 9, and is provided with an annular flange 13, which flange is adapted to contact with its respective end of the axle housing 7. The lining 10 at the flared portion 11 is provided with a plurality of openings 14, the purpose of which will be hereinafter more specifically described.

Between that portion 11 of the axle housing lining 10 and the flange 13, the lining 10 is formed to provide a bearing seat 15 and said bearing seat 15 receives a roller bearing 16, within which the axle 5 is supported. This bearing is maintained in position in the lining 10 by means of a nut 17, threaded upon the axle as at 18, the lining 10 being shaped as indicated by the reference character 19, to form a shoulder against which the bearing 16 is forced by means of the nut 17.

The reference characters 20 and 21 designate an outer and an inner plate, respectively, and these plates 20 and 21 are flanged in order that they may be secured to their respective ends of the axle housing 7, by cap screws or the like 22. Interposed between these plates 20 and 21, is a disc 23 of felt or other suitable material, which disc serves to prevent lubricant contained within the structure from passing beyond the plate 20 to the wheel carried by the portion 6 of the axle.

The axle is cut out as at 25, and mounted in said cut-out portion 25 is a split ring of resilient metal, as indicated by the reference character 26, and said split ring is adapted to prevent lubricant from the differential housing passing from the axle housing to the bearing housing or lubricant chamber 9.

The axle housing 7 is formed with two integral depending lugs 30, and said lugs are perforated as at 31, to receive a hollow bolt 32, which bolt is adapted to support the springs 33. It is to be understood that this construction is duplicated upon the opposite ends of the axle in order that springs may be secured to each end thereof. This hollow bolt communicates with the chamber 9 in the enlarged portion 8 of the axle housing 7, and said hollow bolt is provided with perforations 34, by means of which lubricant from the receptacle 9 may pass to the springs by way of said hollow bolt 32.

From the foregoing it is apparent that the present invention provides a new and novel construction for rear axles of vehicles, which construction permits of the use of light materials in the manufacture of these several parts. Furthermore, the present construction provides a new and novel method of attaching springs to the rear axle, which construction provides for the constant lubrication of the springs at their pivotal point of connection to the axle.

I claim:

1. A rear axle housing formed of relatively light material, a lining therefor, said lining having an enlarged outer end providing a bearing seat, and a bearing mounted in the seat formed in said housing.

2. A rear axle housing formed of relatively soft light material, a reinforcing member in the form of a hollow sleeve of relatively hard material, said reinforcing member forming a lining for the axle housing, a flange carried by said reinforcing member and adapted to engage the end of the rear axle housing, and means for securing said reinforcing member within the rear axle housing, said means passing through the flange of the reinforcing member.

3. A rear axle construction comprising an axle housing of relatively light soft metal and a reinforcing element therefor, said reinforcing element comprising a lining of relatively hard metal, said lining conforming to the interior shape of the axle housing and being formed with a flange defining the open end of said axle housing to limit the longitudinal movement of the lining relative to the housing, and forming means for securing the lining to the housing.

4. A rear axle construction comprising an axle housing of relatively light soft metal, a reinforcing element therefor, said reinforcing element comprising a lining of relatively hard metal, said lining conforming to the interior shape of the axle housing and being formed with a bell-shaped end forming a bearing seat and a flange defining the open end of said axle housing to limit the longitudinal movement of the lining relative to the housing, and means passing through the flange and having engagement with the housing to secure the reinforcing element therein.

VICTOR W. PAGÉ.